May 14, 1963  O. E. BATDORF  3,089,241
CUTOFF DEVICE FOR THREADED BOLTS AND SCREWS
Filed Nov. 21, 1960  2 Sheets-Sheet 1
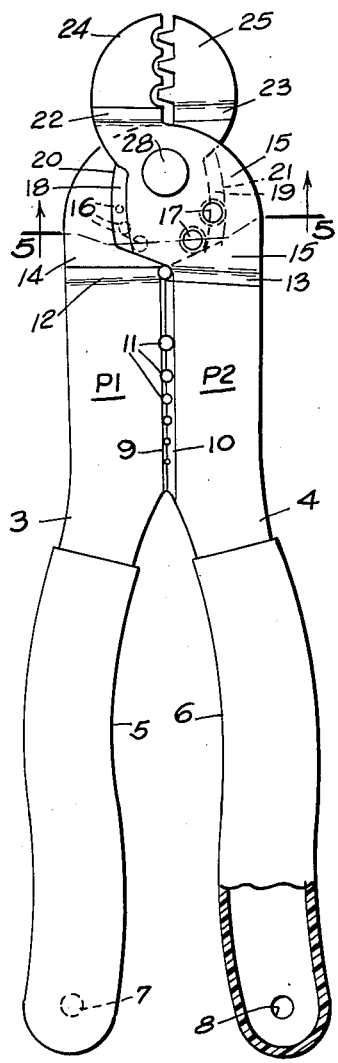
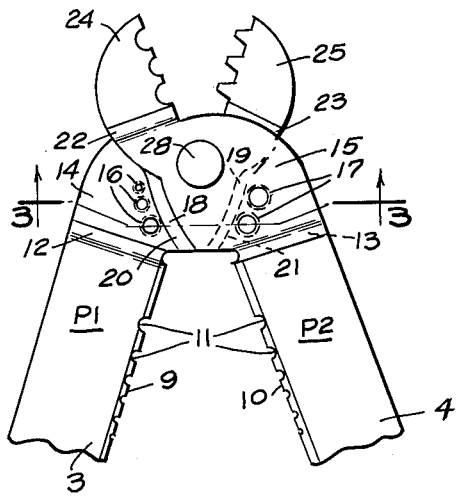
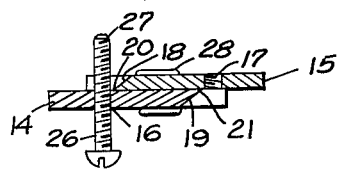
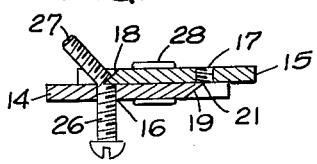
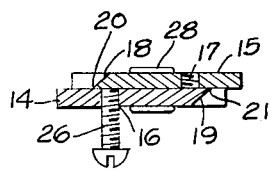
INVENTOR.
OSCAR E. BATDORF
BY
Kegan, Bellamy & Kegan
ATTORNEYS May 14, 1963  O. E. BATDORF  3,089,241
CUTOFF DEVICE FOR THREADED BOLTS AND SCREWS
Filed Nov. 21, 1960  2 Sheets-Sheet 2
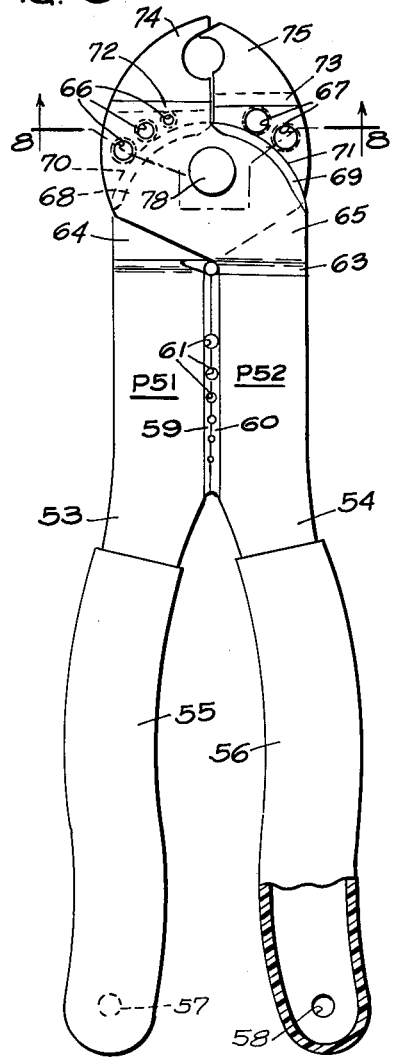
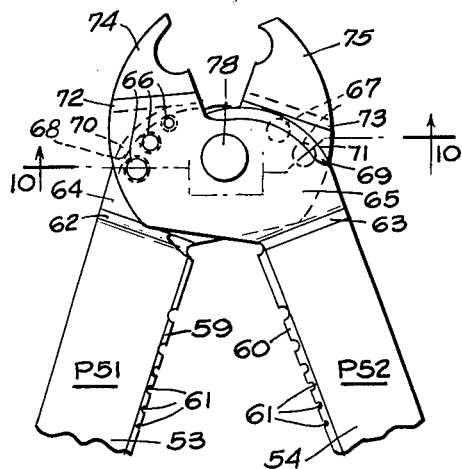
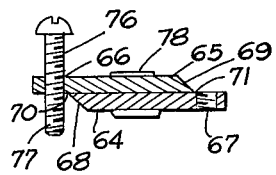
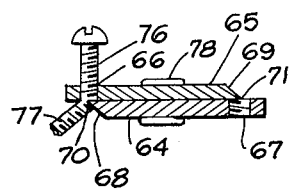
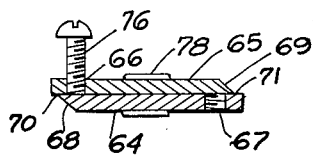
INVENTOR.
OSCAR E. BATDORF
BY
Kegan, Bellamy & Kegan
ATTORNEYS United States Patent Office 3,089,241
Patented May 14, 1963

3,089,241
CUTOFF DEVICE FOR THREADED BOLTS
AND SCREWS
Oscar E. Batdorf, Downers Grove, Ill., assignor to Vaco Products Company, Chicago, Ill., a corporation of Illinois
Filed Nov. 21, 1960, Ser. No. 70,605
4 Claims. (Cl. 30—226)

This invention relates to cutoff devices for threaded bolts and screws, but is concerned more particularly with devices of this type which effect the cutting off operation so as to leave the bolt or screw immediately usable for threading into a nut or other tapped opening.

The principal object of the invention is to provide a simple and economical device of the foregoing character which performs the cutting-off operation more easily and reliably than the devices previously used or known for the indicated purpose.

Devices heretofore known or used for the foregoing purpose have been open either to the objection that the cutting of bolts and screws has required a great force because of the direct break-away shearing action employed, or has been open to the objection that the threads near the cutoff line have been so damaged as to require redressing or chasing before use, which is expensive and time consuming.

According to the invention, the foregoing and other drawbacks of the devices previously known and used have been overcome by providing one of two slidingly cooperative parts with a tapped opening in which the bolt or screw to be cut is held, and by providing the other part with a curved cam portion which greatly reduces the force required to effect a severance of the unwanted end portion of the bolt or screw.

Further according to the invention, a plurality of tapped openings are provided in the first part of the structure adjacent to the noted curved cam surface, whereby the same curved cam may cut off any one of a plurality of bolt or screw sizes.

Still further according to the invention, the force required is further substantially reduced by chamfering the curved cam portion to provide an acute beveled cutting face which changes the action from camming while shearing to camming while cutting.

The foregoing and other features and objects of the invention and the manner of attaining them will become more apparent, and the invention itself will be best understood, by reference to the following description of embodiments of the invention taken in conjunction with the accompanying drawings comprising FIGS. 1 to 10, wherein:

FIGS. 1 to 5 show a first embodiment of the invention;
FIGS. 1 and 2 shown in plan view the closed and the open positions of a pair of pliers according to the first embodiment of the invention;
FIG. 3 is a sectional view through the open cutting jaws of the pliers of FIGS. 1 and 2, taken along line 3—3 of FIG. 2 with a screw in position to be cut;
FIG. 4 is a view similar to FIG. 3, but taken when the pliers are in a partly closed position during the screw-cutting operation;
FIG. 5 is a further sectional view taken along line 5—5 of FIG. 1 with the device completely closed and the screw completely cut;
FIGS. 6 to 10 show a second embodiment of the invention;
FIGS. 6 and 7 show in plan view the closed and the open positions of a pair of pliers according to the second embodiment of the invention;
FIG. 8 is a sectional view through the closed cutting jaws taken along the line 8—8 of FIG. 6 with a screw in position to be cut;
FIG. 9 is a sectional view similar to FIG. 8 but with the structure about half opened during the screw-cutting operation; and
FIG. 10 is a sectional view through the cutting jaws taken along line 10—10 of FIG. 7, with the jaws fully open and with the screw fully cut.

As will be seen upon observing the drawings, it has been chosen to illustrate the invention as applied to a pair of pliers of the general type commonly used in the electrical industry for cutting wires, removing insulation from the wires, and crimping terminals onto such wires.

*First Embodiment—FIGS. 1 to 5*

Referring first to FIGS. 1 to 5 which illustrate the first embodiment of the invention, the bolt-cutting or screw-cutting pliers shown therein comprise two parts P1 and P2 which are pivotally secured together by the riveted pivot 28 for movement between the closed position illustrated in FIG. 1 and the open position illustrated in FIG. 2.

The parts comprise handles 3 and 4, preferably covered and protected by handle grips 5 and 6. The handles have punched openings at 7 and 8 which may be used as pilot openings, along with the openings through P1 and P2 for the pivot member 28, for location of the parts during finish machining operations thereon after they have been punched substantially to the indicated outline. Contiguous portions of parts 1 and 2 are beveled at 9 and 10 to sharpen them for cutting wire. Notched openings 11 are provided in respective wire-gauge sizes to facilitate the removal of insulation from an end portion of a wire length without injury to the wire itself.

The parts 1 and 2 may be punched from sheet steel, such as that having a thickness on the order of ⅛ inch as indicated in FIGS. 3 to 5. Each of the parts P1 and P2 has an offset indicated at 12 and 13, respectively, equal to about half the thickness of the material to bring the beveled portions 9 and 10 opposite each other despite their overlapping relationship in the region of pivot 28. Similar but reverse offsets are provided at 22 and 23 to bring the crimping jaws 24 and 25 into abutting relationship, as is common in pliers construction.

Two curved cam portions 18 and 19 are provided on the respective cutter jaws 15 and 14 for cutting off screws received in any one of the three tapped holes 16 through jaw 14 or in any one of the two tapped holes 17 in jaw 15. The holes 16 in cutter jaw 14 may be tapped for respective screw sizes 4–40, 6–32, and 8–32. These tappings are for size 4, 6, and 8 screws, with the number of threads to the inch as indicated. The holes 17 may be tapped for screw sizes 10–24 and 10–40. These tappings are both for size 10 screws, and are for 24 and 40 threads to the inch, respectively. The foregoing are the screw sizes and thread pitches commonly used in the electrical and electronics field.

As shown in full view in FIG. 2 and in dotted line view in FIG. 1, the profile of the cutting portions 18 and 19 are each of a curved cam shape as shown at 20 and 21, that is, it will be observed that the upper portion of the profile at 20 and at 21 is comparatively close to the center of pivot 28, while the lower portion of the profile at 20 and at 21 is substantially farther from the center of pivot 28. This curved contour is such as to cause the edges 20 and 21 to wipe gradually along and over the tapped openings comprising sets 16 and 17 as the tool is brought from its open position of FIG. 2 to its closed position of FIG. 1. In the open position of FIG. 2, the tapped holes 16 and 17 are completely exposed, while they are completely closed in the closed position of FIG. 1 by being overlapped by the cam-shaped cutting portions 18 and 19.

The cutting force required is comparatively small because of the gradually rising cam shape or contour shown in FIGS. 1 and 2 for 20 and 21.

The cutting action of the tool of FIGS. 1 to 5 is rendered still smoother and easier by rearwardly inclining the cutting surface in each of the regions 18 and 19 to provide cutting or slicing edges at 20 and 21. The angle between the surfaces meeting at 20 or 21 is preferably on the order of from thirty to sixty degrees, the median of which is forty-five degrees.

Operation of First Embodiment—FIGS. 1 to 5

FIGS. 3 to 5 are provided to further illustrate the cutting action accomplished when a screw or bolt has been threaded into one of the sets of tapped openings 16 and 17, starting with the structure in its open position shown in FIGS. 2 and 3. FIG. 3 shows an 8-32 screw 26 threaded into and partly through the lowermost one of the three tapped openings 16 of FIGS. 1 and 2. The distance between the head of the screw 26 and the remote surface of jaw 14 is adjusted (by turning the screw 26 in the tapped hole) to equal the screw length desired after the undesired portion 27 has been cut off. In this inserted position, with the pliers fully open, the cam-contoured cutting edge 20 lies but a short distance to the right of the side of the screw as seen from FIGS. 2 and 3.

The handles 3 and 4 are now brought firmly toward each other, as by squeezing on the handle grips 5 and 6, to bring the structure from the open position of FIG. 2 toward the closed position of FIG. 1. The partly-closed position shown in FIG. 4 is reached when the structure has been moved about half way toward the closed position of FIG. 1. At that time, it will be observed that the cutting edge portion 20 of the acutely angled and cammed curved cutting blade 18 has been advanced approximately to the center of the screw 26 to cut through about half the diameter thereof. This cutting action has caused the portion 27, which is to be removed, to be tipped over at an angle of about 45°. It is a feature of the invention that the part 27 is permitted to thus tip over freely to still further reduce the cutting-off force, whereas certain of the prior art devices hold the portion being cut off rather closely in a guide hole through the jaw performing the cutting operation.

As the closing movement continues from the mid-position shown in FIG. 4, the tool proceeds toward and reaches its closed position of FIGS. 1 and 5. In that position the end of the now cut screw 26 is completely overlapped by the cutting blade 18 and edge 20. Before this position is reached, the part 27 of FIGS. 3 and 4 has been completely cut off, and the cut end of the screw 26 has been completely wiped over to remove any burrs that may have been left in the cutting operation.

The screw 26 may now be easily removed from the closed structure of FIG. 5 by merely screwing it back out of jaw 14 by hand. Any minor deformations that may have occurred at the cut end of the threads is smoothed or dressed as the screw is screwed out of the jaw 14. By similar operations, screws placed in either one of the other two holes 16 may be cut by the acute angled cutter blade 18 at edge 20.

Screws threaded into openings 17 in jaw 15 may be cut by blade 19 carried by jaw 14. As before, the structure is opened to the position of FIG. 2, whereupon the screw is threaded into the desired hole 17 to the desired depth, following which the handles are squeezed together until the structure assumes the closed position of FIG. 1. During this closing movement, the screw is held in tapped hole 17 in overlying jaw 15 and is cut off by blade 19 of underlying jaw 14.

Second Embodiment—FIGS. 6 to 10

The structure of FIGS. 6 to 10, comprising the second embodiment, is generally similar to the structure of FIGS. 1 to 5 except that the second embodiment is arranged to perform bolt and screw cutting on pulling the tool to its open position rather than on operating it to its closed position.

The tool of FIGS. 6 to 10 comprises parts P51 and P52 secured pivotally together by the riveted pivot 78. It includes handles 53 and 54, handle grips 55 and 56, pilot holes 57 and 58 in the handles, wires cutting edges 59 and 60, a series of stripping gaps or openings 61, offsets 62 and 63 between the handles and the jaws, and similar offsets 72 and 73 forward of the pivot 78, such offsets corresponding to 12, 13, 22, and 23 of FIGS. 1 and 2.

The overlapping jaws 64 and 65 (corresponding respectively to jaws 14 and 15) are provided with outside screw-cutting portions 68 and 69 ending in cutting edges 70 and 71. These cutting portions are each provided with a curved cam surface to render bolt and screw cutting easier as noted for the embodiment of FIGS. 1 to 5, and the marginal portions 68 and 69 are angled as described for the marginal portions 18 and 19.

At a location just forward of the cutting edges 70 and 71, jaw 65 is provided with two tapped holes 67 which correspond to the tapped holes 17 of FIGS. 1 and 2, and jaw 64 is provided with three tapped holes 66 which correspond to the three tapped holes 16. The two jaws 74 and 75 extending upwardly from the offsets 72 and 73 correspond to jaws 24 and 25 except that they are contoured to grip an insulated terminal to crimp a wire which has been inserted therein.

When a screw is to be cut by the structure of FIGS. 6 to 10, the screw is threaded into the appropriate one of the openings in sets 66 and 67 when the tool is in the closed position shown in FIGS. 6 and 8. It may be assumed, for example, that the screw is one accommodated by the outermost one of the three openings 66 and comprises the screw 76 inserted to the depth indicated in FIG. 8, leaving the portion 77 to be cut off extending downwardly beneath the jaw 65, adjacent the cutting edge 70 of the marginal cutting portion 68.

Following the noted insertion of the screw 76 to the desired depth shown in FIG. 8, the tool is grasped by the handle grips 55 and 56 and pulled toward the open position shown in FIG. 7.

When the intermediate position indicated in FIG. 9 has been reached, the leading edge 70 of the marginal cam-shaped and bevelled blade portion 68 has undergone a camming outward cutting action to about the center of screw 76, cutting about half-way through that screw and tipping the lower end portion 77 to the left as shown in FIG. 9.

As the opening movement progresses, a larger and larger portion of the tapped holes 66 and 67 are covered by the marginal blade portion 68 and 69. Blade 68 and its forward edge 70 accordingly cut further and further through screw 76 until the unwanted portion 77 thereof is cut cleanly from the screw 66 just prior to the fully opened position of FIGS. 7 and 10 being reached. By that time, as shown in FIG. 10, the part 77 has been cut completely from the screw or bolt 76, and the cut end of screw 76 has been completely overlapped by jaw 64, with the cutting edge 70 of the tapered cam shaped marginal portion 68 being disposed outwardly beyond the now cut off screw 76.

The screw 76 may now be readily turned backward out of threaded engagement with the tool, which action accomplishes any required slight thread-dressing action as pointed out for the tool of FIGS. 1 to 5. The cut off screw 76 may now be used in any usual or desired manner, and the tool of FIGS. 6 and 10 is in readiness for any further desired use thereof.

In comparison to the structure of FIGS. 1 to 5, the structures of FIGS. 6 to 10 has a greater width of jaws 64 and 65 adjacent to the pivot 78, whereby any tendency toward a cracking of a jaw 14 or 15 along a line radial to the pivot location is greatly reduced.

A special feature of the tool of FIGS. 6 to 10 is that it eliminates any likelihood of the operator cutting his fingers incident to cutting bolts or screws, because the handles are then pulled apart (rather than being squeezed together), as distinct from the embodiment of FIGS. 1 to 5 wherein the handles are squeezed together for the described cutting action.

A feature common to both embodiments is that the cutting edge portions 20 and 21 of the first embodiment and 70 and 71 of the second embodiment are protected from contact with surrounding objects by their continuously overlying jaws 14, 15, 64, and 65, respectively. This feature of continuous overlap of the cutting edges protects the person of the operator from injurious or cutting contact with the cutting edges.

While I have described above the principles of my invention in connection with specific apparatus, it is to be clearly understood that this description is made only by way of example and not as a limitation to the scope of my invention.

I claim:

1. In a screw cutter for shortening screws, wherein the cutter is of the type which includes a screw-holding part and an overlapping screw-cutting part mounted together for a reciprocable sliding movement of each part back and forth along the surface of the other, with the screw-holding part having at least one threaded hole therethrough at a location which is alternately covered and uncovered by the sliding movement, the improvement which comprises providing the edge portion of the screw-cutting part which passes back and forth over the threaded hole with slicing edge having a cam contour which makes an acute angle with the direction of movement to thereby prolong the relative movement required to completely cover the threaded hole, the force required to execute the said sliding movement to cut off a screw passed through the threaded hole being correspondingly reduced according to the corresponding increase in the extent of the said movement required to cover the threaded hole.

2. A screw cutter according to claim 1, wherein the said edge portion is inclined back away from the profile edge thereof at an acute angle with the surface of such member which overlaps the said threaded hole.

3. The screw cutter of claim 1 wherein the said edge portion of the screw-cutting part which passes back and forth over the said threaded hole is provided with a curved cam contour.

4. In a screw cutter for shortening screws, wherein the cutter is of the type which includes a screw-holding part and an overlapping screw-cutting part mounted together for a reciprocable sliding movement of each part back and forth along the surface of the other, with the screw-holding part having at least one threaded hole therethrough at a location which is alternately covered and uncovered by the sliding movement, the improvement which comprises providing the edge portion of the screw-cutting part which passes back and forth over the threaded hole with a cam contour which makes an acute angle with the direction of movement to thereby prolong the relative movement required to completely cover the threaded hole, the said edge portion being shaped to provide a side wall extending back from the edge of such portion at an acute angle with the surface of contact between the parts.

References Cited in the file of this patent

UNITED STATES PATENTS

| 1,359,315 | Barufke | Nov. 16, 1920 |
| 2,560,318 | Wenger | July 10, 1951 |

FOREIGN PATENTS

| 59,158 | Germany | Oct. 1, 1891 |